United States Patent
Chiu et al.

(10) Patent No.: US 6,886,052 B2
(45) Date of Patent: Apr. 26, 2005

(54) APPARATUS AND METHOD FOR AUTOMATICALLY IDENTIFYING BETWEEN USB AND PS/2 INTERFACE

(75) Inventors: Yen-Chang Chiu, Taipei (TW); Kao-Pin Wu, Hsinchu (TW); Ting-Hao Yeh, Tainan (TW); Ming-Chuan Lo, Hsinchu (TW)

(73) Assignee: Elan Microelectronics Corporation, Hsin-Chu (TW)

( * ) Notice: Subject to any disclaimer, the term of this patent is extended or adjusted under 35 U.S.C. 154(b) by 0 days.

(21) Appl. No.: 10/335,875

(22) Filed: Jan. 3, 2003

(65) Prior Publication Data

US 2003/0135655 A1 Jul. 17, 2003

(30) Foreign Application Priority Data

Jan. 16, 2002 (TW) ........................................ 91100725 A (51) Int. Cl.⁷ ............................................. G06F 13/14
(52) U.S. Cl. ................ 710/14; 710/8; 710/16; 326/37; 326/62
(58) Field of Search ................ 710/16, 14, 8; 326/37, 62

(56) References Cited

U.S. PATENT DOCUMENTS

| | | | | |
|---|---|---|---|---|
| 6,460,094 B1 | * | 10/2002 | Hanson et al. | 710/8 |
| 6,529,145 B1 | * | 3/2003 | Lin | 341/22 |
| 6,601,124 B1 | * | 7/2003 | Blair | 710/305 |
| 6,625,790 B1 | * | 9/2003 | Casebolt et al. | 716/8 |
| 6,691,201 B1 | * | 2/2004 | Williams et al. | 710/315 |

* cited by examiner

Primary Examiner—A. Elamin
(74) Attorney, Agent, or Firm—Rosenberg, Klein & Lee (57) ABSTRACT

An automatic interface identification technique for an apparatus capable of supporting both USB and PS/2 interfaces comprises connecting a detector to first and second ports provided for the apparatus connected to a host computer through a USB or PS/2 interface. The detector has an interface detect function including a logic confirming mechanism and an interface identifying algorithm and a mode select function receiving first and second control signals such that the logic confirming mechanism is connected to the first and second ports by the interface detect function to detect the logic states of the first and second ports in association with the interface identifying algorithm to thereby correctly identify a USB or PS/2 interface is connected and to further determine USB or PS/2 mechanism in response to signal transmissions.

5 Claims, 7 Drawing Sheets

| Mode\Control signal\Mode Signal | $M_{USB}$ | $M_{PS/2}$ | SW0 | SW1 | SW2 |
|---|---|---|---|---|---|
| Detect Mode | 0 | 0 | H | L | L |
| PS/2 Mode | 0 | 1 | L | H | L |
| USB Mode | 1 | 0 | L | L | H |

APPARATUS AND METHOD FOR AUTOMATICALLY IDENTIFYING BETWEEN USB AND PS/2 INTERFACE

BACKGROUND OF THE INVENTION

1. Field of the Invention

The present invention relates generally to a communication interface, and more particularly to an apparatus and method for automatically identifying between USB and PS/2 interface.

2. Related Art

USB is a standard interface for the connections or communications between computer systems and their peripherals. Although currently more and more peripherals support USB interfaces, those with low transmission rate, such as keyboard and mouse, will be more accepted in the market if they can support conventional PS/2 interfaces as well.

Figure 1:
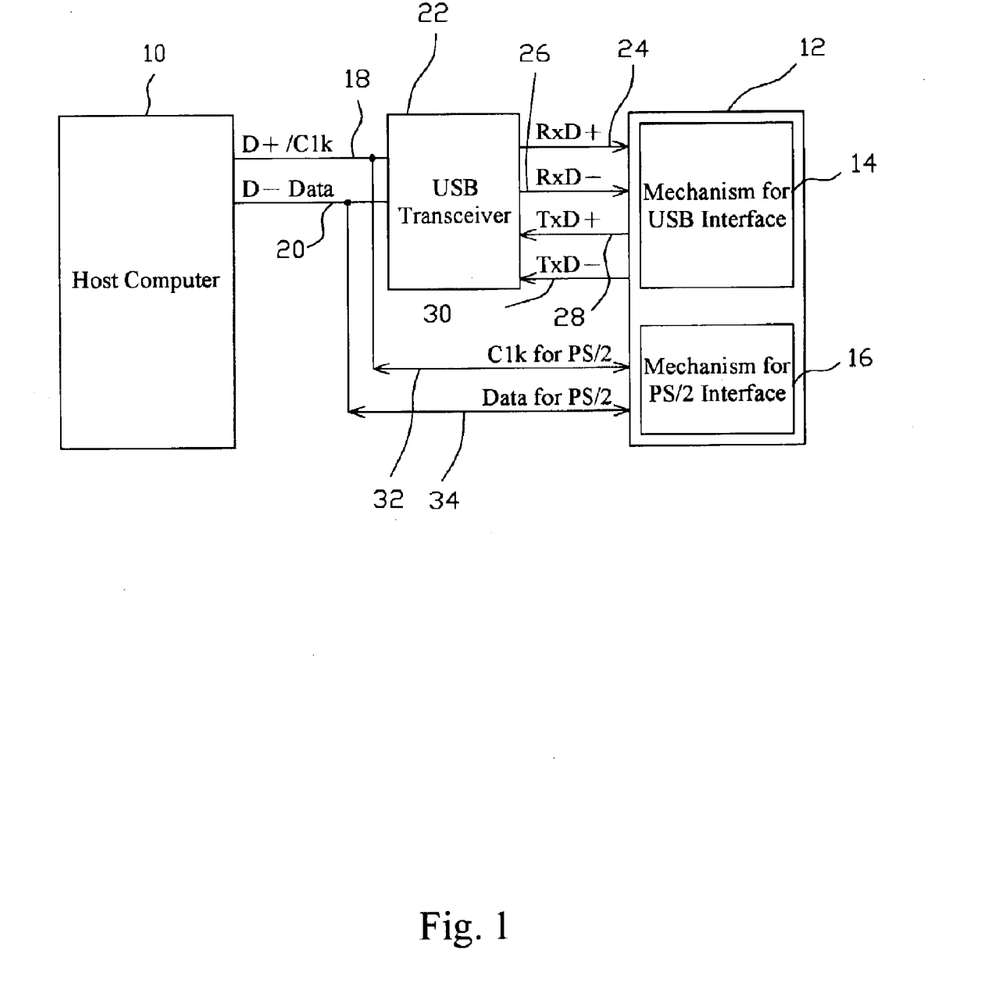
FIG. 1 is a system block diagram to illustrate a host computer connected to a peripheral that supports USB and PS/2.

FIG. 1 is a system block diagram to show a host computer 10 connected to a peripheral 12, such as microcontroller unit (MCU), that supports USB and PS/2 transmission function and includes a mechanism 14 capable of handling USB transmission specification and a mechanism 16 capable of handling PS/2 transmission specification both connected to the host computer 10 but exclusive to each other at same time through first and second ports 18 and 20. The first port 18 is provided for the transmission of the signal D+ of USB interface or the clock of PS/2 interface, and the second port 20 is for the transmission of the signal D− of USB interface or data signal of PS/2 interface. The USB mechanism 14 needs a USB transceiver 22 to be connected to the first and second ports 18 and 20 with connection of the receiver signal RxD+ port 24 and RxD− port 26 and the transmitter signal TxD+ port 28 and TxD− port 30 to and from the USB mechanism 14, and the PS/2 mechanism 16 is directly connected to the first and the second ports 18 and 20 with its clock port 32 and data port 34.

To ensure the peripheral 12 to communicate with the host computer 10 with the same transmission interface specification, the USB or PS/2 interface must be identified according to the logic states of the first and second ports 18 and 20 when it is initially connected to the host computer, and then the USB or PS/2 transmission mechanisms 14 or 16 is responsible to interactive to the host computer 10.

Figure 2:
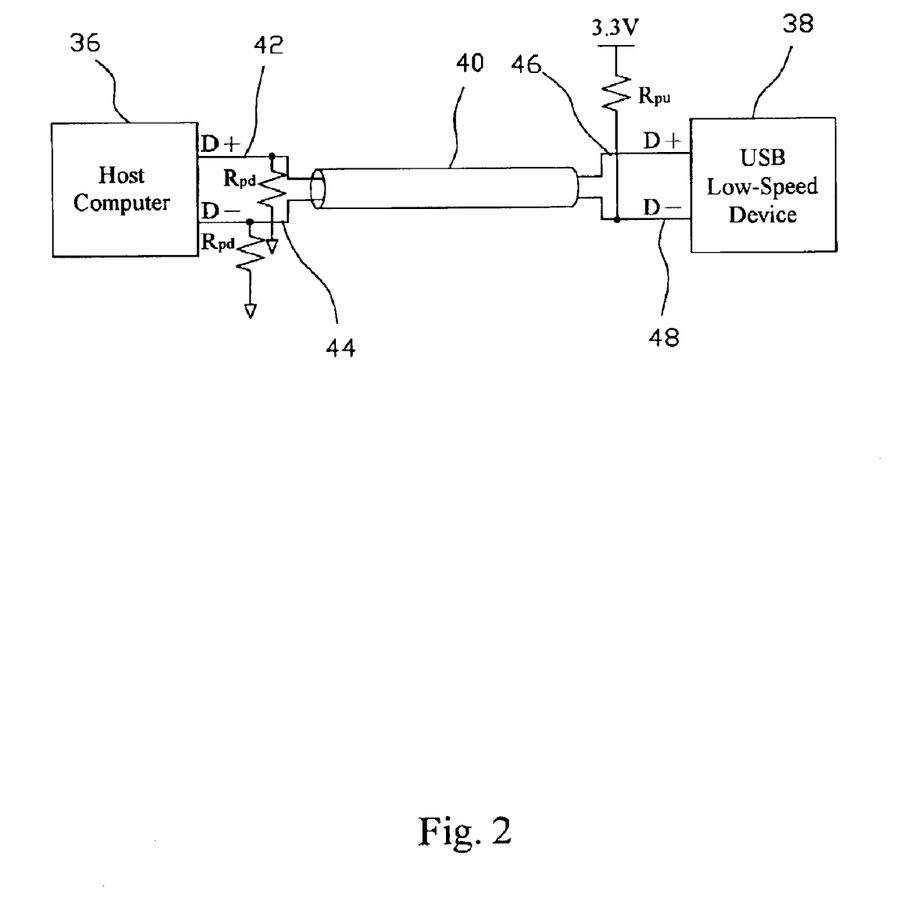
FIG. 2 shows the connection of a USB low-speed device with a host computer.

USB interface standard covers low-speed device and high-speed device. FIG. 2 shows the connection of a USB low-speed device 38 to a host computer 36 through a cable 40 on their respective D+ ports 42 and 46 and D− ports 44 and 48. At the side of the host computer 36, there are two 15 KΩ pull-down resistors Rpd connected from the D+ signal port 42 and D− signal port 44 to ground, and at the side of the low-speed device 38 a 1.5 KΩ pull-up resistor Rpu connected between supply voltage 3.3 V and the D− signal port 48. On the other hand, the only difference between USB full-speed device and the above-mentioned low-speed device is that the pull-up resistor Rpu is connected to the D+ signal port for full-speed device.

Conventionally, the identification of USB and PS/2 interface utilizes the characteristics of the direct connection of the pull-down resistor Rpd on the USB port of the host computer. Referring to FIG. 1 and FIG. 2 at same time, in accordance with USB interface standard, when the peripheral 12 is connected to the host computer 10, initially the pull-up resistor Rpu will not be connected onto the port, as a result, if the first and second ports 18 and 20 are both logic "0" at this time, it is determined a USB interface is connected thereto, otherwise, it is a PS/2 interface. The drawback of this method is that the PS/2 port at the side of the host computer 10 may be floating or in high impedance, which will result in uncertain level of the D+ and D− ports 18 and 20 when the peripheral 12 is connected thereto and, as a result, the misjudgment of the interface type.

Therefore, it is desired an apparatus and method to correctly and automatically identify between USB and PS/2 interface.

SUMMARY OF THE INVENTION

One object of the present invention is to provide an apparatus and method for automatically identifying between USB and PS/2 interface, by which a detector is connected to a first and second ports that are provided to be connected to a host computer through USB or PS/2 interface. The detector includes two functions, mode selection and interface detection. The interface detection includes a logic confirming mechanism and an interface identifying algorithm. The mode selection includes receiving a first and second control signals for the selection of USB or PS/2 mode, such that the logic confirming mechanism is correctly configured for the first and second ports. By detecting the logic states of the first and second ports by the interface detection and in association with the interface identifying algorithm, it can be correctly identified which interface between USB and PS/2 is connected thereto, and thereby to determine to support the signal transmission in USB or PS/2 mode.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
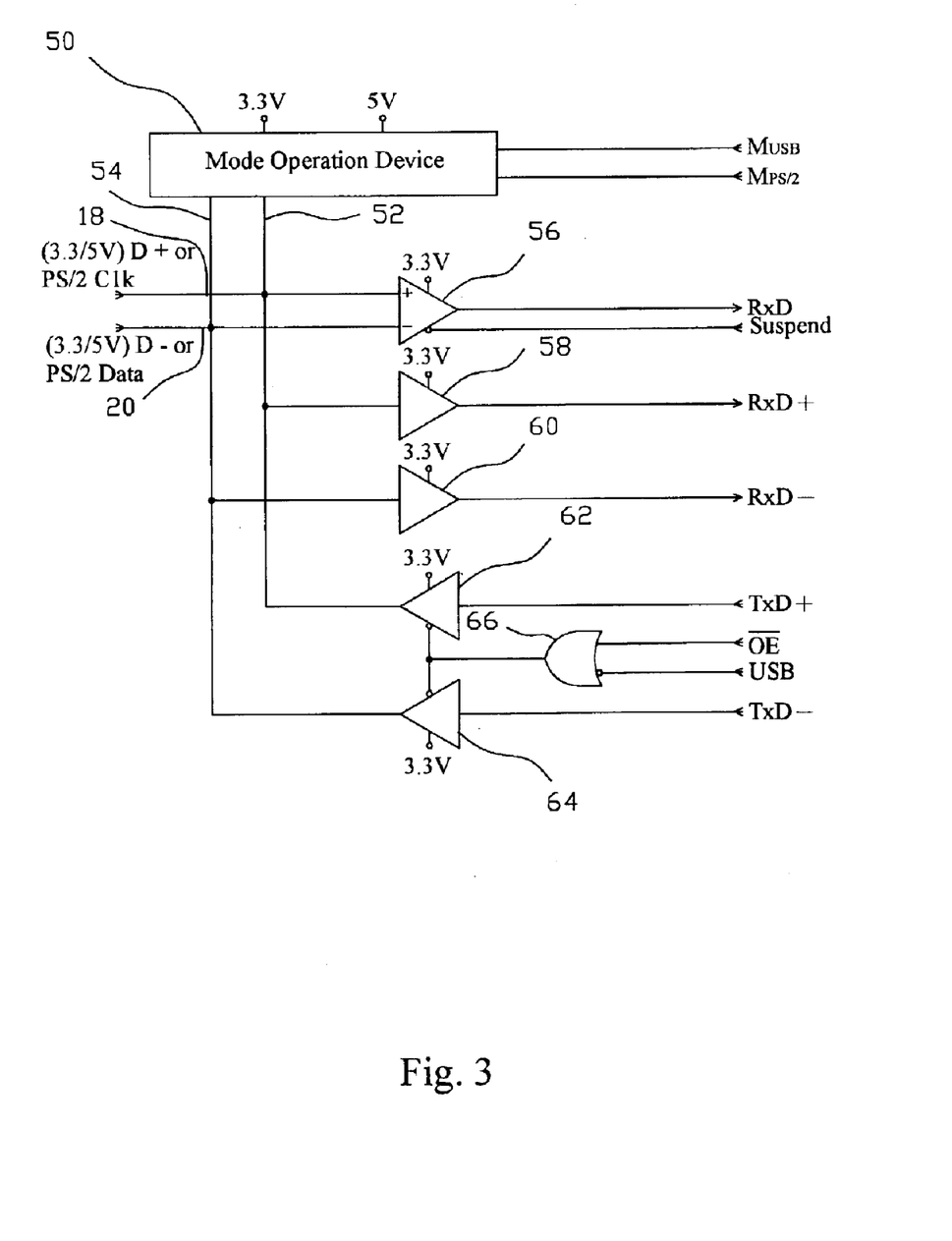
FIG. 3 is the composition of a USB transceiver.

The system block diagram according to the present invention is the same as that shown in FIG. 1, and the specification as shown in FIG. 2 shall be also followed in case of applications on USB low-speed devices. However, one embodiment arrangement in a USB transceiver of the present invention is shown in FIG. 3, which includes a mode operation device 50 to receive two control signals $M_{USB}$ and $M_{PS/2}$ and its two ports 52 and 54 are connected to D+ or PS/2 Clk port 18 and D− or PS/2 Data port 20, respectively. As in the prior art schemes, the transceiver also includes a differential receiver 56, single-input receivers 58 and 60, and USB output buffers 62 and 64 to receive and transmit USB signals. The mode operation device 50 includes a detector to detect the logic states of the ports 18 and 20 to further identify USB or PS/2 interface.

Figure 4:
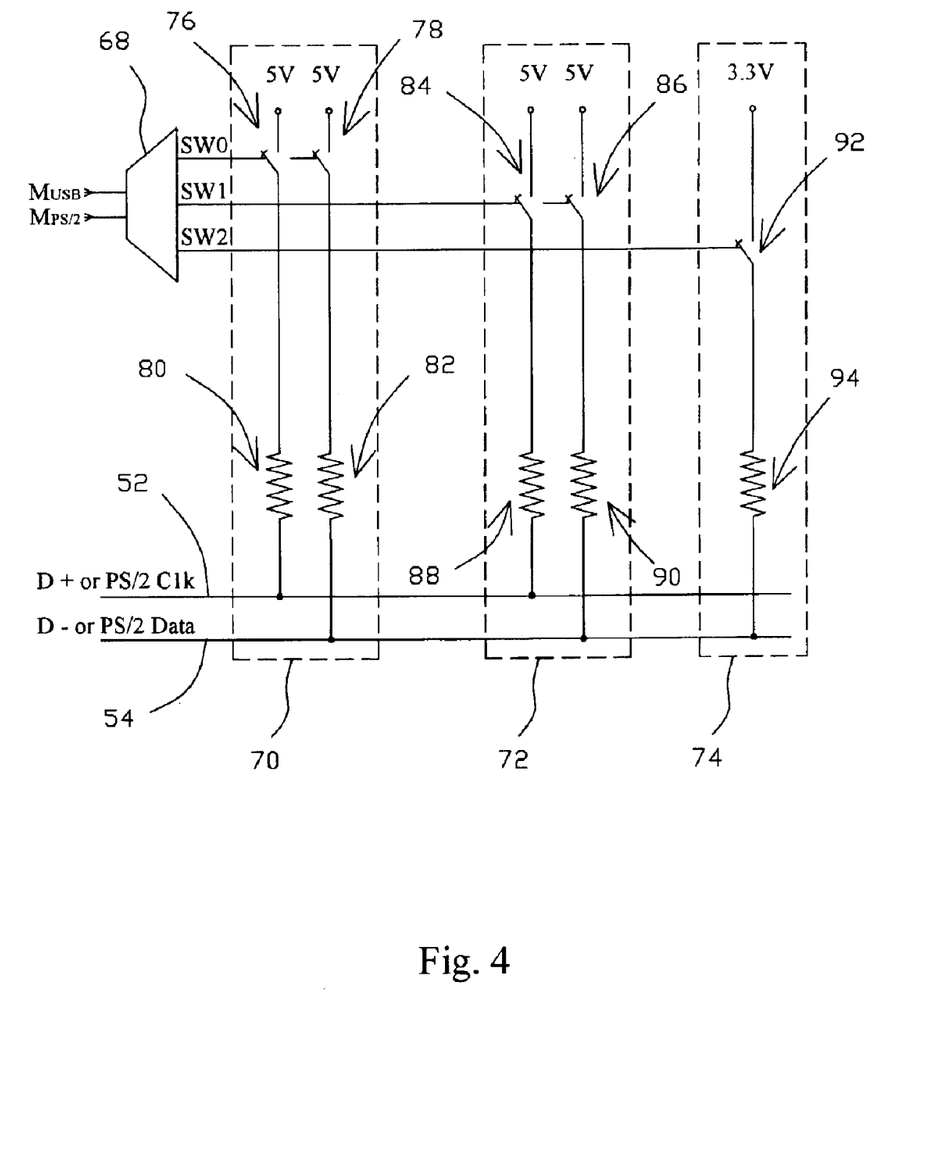
FIG. 4 is an embodiment mode operation device.
Figure 5:
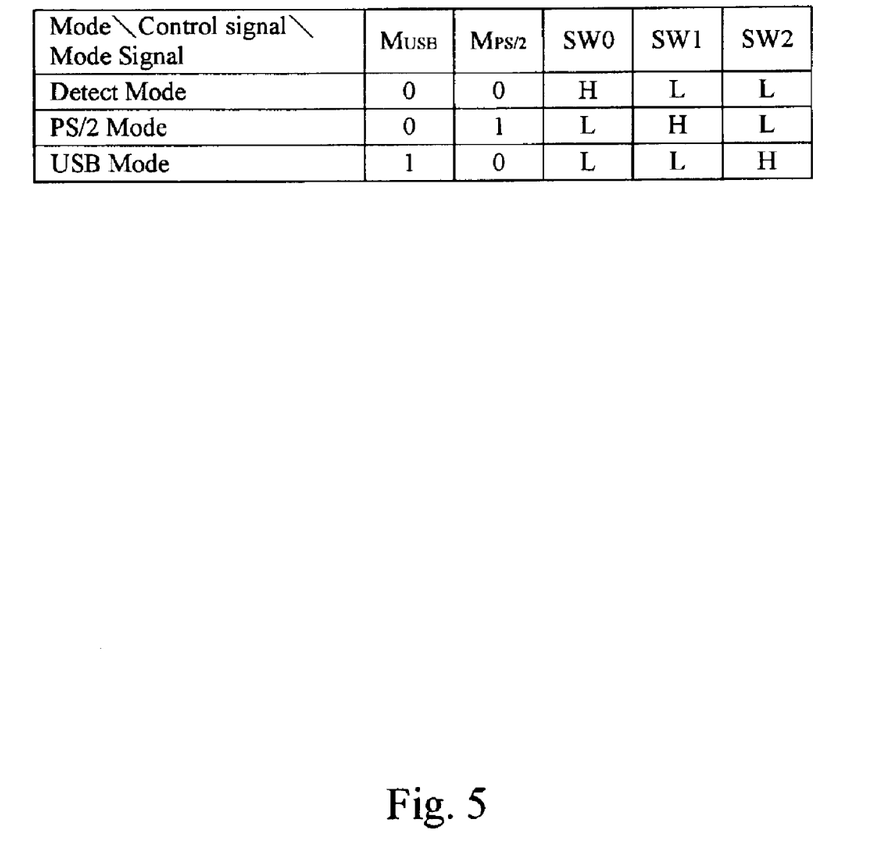
FIG. 5 is the logic table of the circuit shown in FIG. 4.

FIG. 4 is an embodiment circuit of the mode operation device 50 that includes a mode selector 68, a mode detector 70, a PS/2 mode device 72, and a USB mode device 74, by which the mode selector 68 produces three mode signals SW0, SW1 and SW2 according to the control signals $M_{USB}$ and $M_{PS/2}$ on its inputs, and the mode detector 70 includes switches 76 and 78 under the control of the detect mode signal SW0 to connect resistors 80 and 82 to supply voltage 5V, respectively. In this embodiment, the resistors 80 and 82 are both 200 KΩ for the function of logic confirmation. The PS/2 mode device 72 includes switches 84 and 86 under the control of the PS/2 mode signal SW1 to connect pull-up resistors 88 and 90 to supply voltage 5V, and the pull-up resistors 88 and 90 for the PS/2 interface are both about 4.7 KΩ. The USB mode device 74 includes a switch 92 under the control of the USB mode signal SW2 to connect a pull-up resistor 94 to supply voltage 3.3V, and the pull-up resistor 94 for the USB interface is about 1.5 KΩ. The logic table of this circuit is shown in FIG. 5.

In detect mode, the control signals $M_{USB}$ and $M_{PS/2}$ are both set to logic "0" and the detect mode signal SW0 at the moment is at high state and the others SW1 and SW2 are at low state. In PS/2 mode, the control signal $M_{USB}$ is logic "0" and the control signal $M_{PS/2}$ is logic "1", and at this moment the PS/2 mode signal SW1 is at high state and the others SW1 and SW2 are at low state. In USB mode, the control signal $M_{USB}$ is logic "1" and the control signal $M_{PS/2}$ is logic "0", and at the moment the USB mode signal SW2 is at high state and the others SW0 and SW1 are at low state. The mode signals SW0, SW1 and SW2 at high state mean that the corresponding switches they control are turned on.

In this embodiment circuit, independent resistors 80, 82, 88, 90, and 94 are used for the pull-up resistors of the various mode devices 70, 72 and 74, while in other embodiment circuits, a resistor network may be used and is configured by a control circuit to obtain the required equivalent resistance under different modes.

Figure 6:
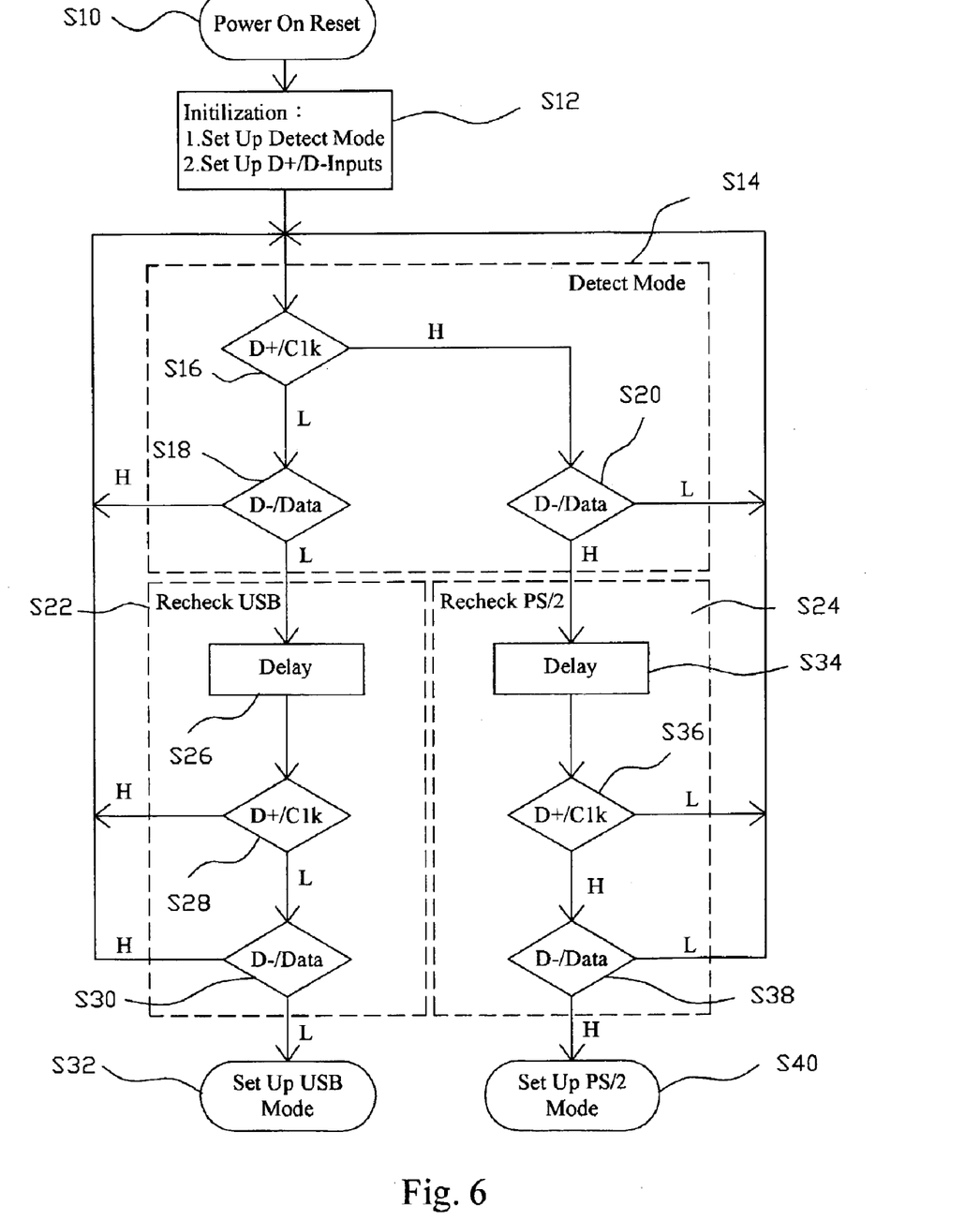
FIG. 6 is a basic flow chart of USB and PS/2 identification.

Application of the circuit shown in FIG. 4 to the system of FIG. 1 has an embodiment process shown in FIG. 6. After power supply is turned on or the system is reset in step S10, initialization in step S12 sets up in detect mode and the D+/D− input, then it enters into detect status S14. In step S16 the logic state of D+/Clk port 18 is detected, and it goes to step S18 if low state is detected, otherwise to step S20 if high state is detected. In step S18 the logic state of D−/Data port 20 is detected, and it jumps back to step S16 if high state is detected, otherwise it goes to USB recheck status S22 if low state is detected. In step 20 the logic state of D−/Data port 20 is detected, and it jumps back to step S16 if low state is detected, otherwise it goes to PS/2 recheck status S24 if high state is detected. In USB recheck status S22, a short time delay is introduced in step S26, and the logic state of D+/Clk port 18 is detected again in step S28 to jump back to step S16 if high state is detected and to step S30 if low state is detected. If high state is detected on the D−/Data port 20 in step 30, it will jump back to step S16, otherwise it goes to step S32 if low state is detected, and USB mode is set up in step 32. In PS/2 recheck status S24, a short time delay is introduced in step S34, and then the logic state of D+/Clk port 18 is detected in step S36 to jump back to step S16 if low state is detected, otherwise to go to step S38 if high state is detected. Then the logic state of D−/Data port 20 is detected again in step 38, and it jumps back to step S16 if low state is detected, otherwise to step S40 if high state is detected to set up PS/2 mode.

The operational principle of the circuit shown in FIG. 4 is now further described. When the peripheral 12 is connected to the computer interface at beginning, the peripheral 12 sets up the control signals $M_{USB}$ and $M_{PS/2}$ to logic "0", i.e., under detect mode, in this manner 200 KΩ pull-up resistors 80 and 82 are connected to the D+ and D− ports 52 and 54. In case D+ and D− ports 52 and 54 are detected at high states, i.e., logic "1", the interface is identified as PS/2 and the peripheral 12 set up the control signals $M_{USB}$ and $M_{PS/2}$ to logic "0" and "1", respectively, i.e., into PS/2 mode, and 4.7 KΩ pull-up resistors 88 and 90 are connected to the D+ and D− ports 52 and 54, respectively. In contrast, if the D+ and D− ports 52 and 54 are detected at low states, i.e., logic "0", the interface is identified as USB, and then the peripheral 12 sets up the control signals $M_{USB}$ and $M_{PS/2}$ to logic "1" and "0", i.e., into USB mode, and 1.5 KΩ pull-up resistor 94 is connected to the D− port 54 for USB low-speed device.

Figure 7:
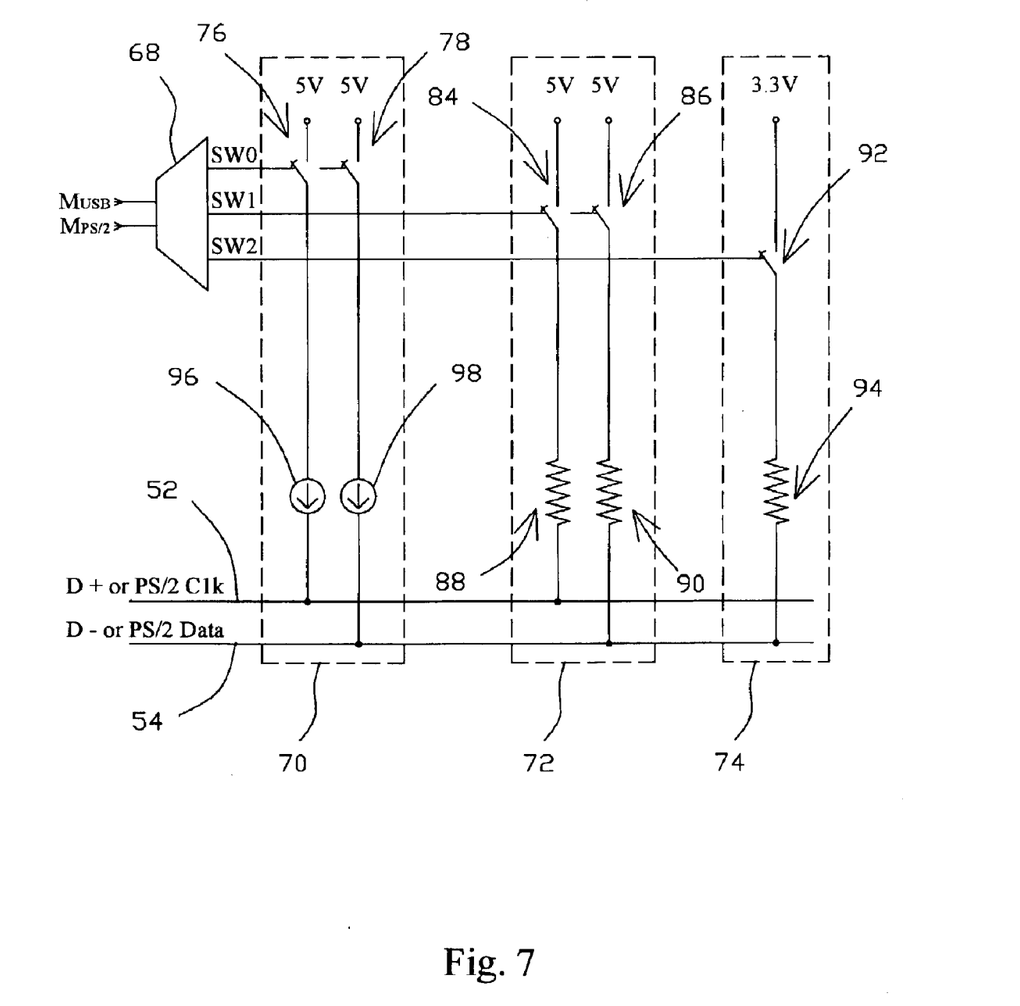
FIG. 7 is another embodiment circuit for the mode operation device.

Although the mode detector 70 of FIG. 4 uses resistors 80 and 82 to connect to the ports 52 and 54, other devices able to offer logic confirmation are also applicable. FIG. 7 is another embodiment circuit for the mode operation device 50, in which small current sources 96 and 98 are used to replace the resistors 80 and 82. In detect mode, if USB interface is at the side of the host computer 10, the current will flow from the current sources 96 and 98 to the pull-down resistor Rpd on the ports 42 and 44 of the host computer 10, and thereby the ports 52 and 54 are detected at logic "0". On the contrary, if PS/2 interface is at the side of the host computer 10, no current will flow from the current sources 96 and 98 to the ports 42 and 44 of the host computer 10, and, as a result, the ports 52 and 54 will be detected at logic "1". In other words, logic confirmation can be made by use of the resistors 80 and 82 in FIG. 4 or the current sources 96 and 98 in FIG. 6, which avoids interface misjudgment resulted from floating on the ports 42 and 44 of the host computer 10, and similar effects will be produced by use of other devices with voltage dividing or current injection.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for automatically identifying between a USB and a PS/2 interface, comprising:

first and second ports being connected to one of a USB interface or a PS/2 interface;

a mode selector;

a mode detector coupled to said mode selector for detecting a logic state of the first and second ports responsive to a first control signal from said mode selector, said mode detector including (a) a pair of first switching devices coupled to said mode selector and a first positive voltage source, and (b) a pair of first pull-up resistors each having a first end respectively coupled to said first and second ports, a second end of each of said first pull-up resistors being coupled to a respective one of said first switching devices for coupling to said first positive voltage source responsive to said first control signal;

a PS/2 mode device coupled to said mode selector and being coupled said first and second ports responsive to a second control signal from said mode selector, said PS/2 mode device including (a) a pair of second switching devices coupled to said mode selector and said first positive voltage source, and (b) a pair of second pull-up resistors each having a first end respectively coupled to said first and second ports, a second end of each of said second pull-up resistors being coupled to a respective one of said second switching devices for coupling to said first positive voltage source responsive to said second control signal; and, a USB device coupled to said mode selector and being coupled said first and second ports responsive to a third control signal from said mode selector, said USB device including (a) a third switching device coupled to said mode selector and a second positive voltage source, said second positive voltage source being at a lower voltage than said first positive voltage source, and (b) a third pull-up resistor having a first end coupled to one of said first and second ports, a second end of said third pull-up resistor being coupled to said third switching device for coupling to said second positive voltage source responsive to said third control signal.

2. An apparatus for automatically identifying between a USB and a PS/2 interface comprising:

first and second ports being connected to one of a USB interface or a PS/2 interface;

a mode selector;

a mode detector coupled to said mode selector for detecting a logic state of the first and second ports responsive to a first control signal from said mode selector, said mode detector including (a) a pair of first switching devices coupled to said mode selector and a first positive voltage source, and (b) a pair of current sources each having a first end respectively coupled to said first and second ports, a second end of each of said current sources being coupled to a respective one of said first switching devices for coupling to said first positive voltage source responsive to said first control signal;

a PS/2 mode device coupled to said mode selector and being coupled said first and second ports responsive to a second control signal from said mode selector, said PS/2 mode device including (a) a pair of second switching devices coupled to said mode selector and said first positive voltage source, and (b) a pair of PS/2 device pull-up resistors each having a first end respectively coupled to said first and second ports, a second end of each of said PS/2 device pull-up resistors being coupled to a respective one of said second switching devices for coupling to said first positive voltage source responsive to said second control signal; and, a USB device coupled to said mode selector and being coupled said first and second ports responsive to a third control signal from said mode selector, said USB device including (a) a third switching device coupled to said mode selector and a second positive voltage source, said second positive voltage source being at a lower voltage than said first positive voltage source, and (b) a USB device pull-up resistor having a first end coupled to one of said first and second ports, a second end of said USB device pull-up resistor being coupled to said third switching device for coupling to said second positive voltage source responsive to said third control signal.

3. A method for automatically identifying a USB or PS/2 interface connected to a peripheral having first and second ports configured to connect to the identified USB or PS/2 interface, the method comprising the steps of:

(a) connecting logic confirming mechanism to the first and second ports;

(b) detecting logic states on the first and second ports;

(c) repeating step (b) if the logic states on the first and second ports are different one from the other;

(d) waiting a delay time if the logic states on the first and second ports are equivalent;

(e) following step (d), detecting logic states on the first and second ports again;

(f) repeating step (b) if the logic state on the first port or the second port is different from the corresponding logic state obtained in step (b);

(g) determining a USB or PS/2 mode where the logic states of step (e) are equivalent to the corresponding logic states obtained in step (b); and, (h) connecting a first positive voltage source through a pair of PS/2 pull-up resistors to the first and second ports responsive to the PS/2 mode being detected, or connecting a second positive voltage source through a single USB resistor to one of the first and second ports responsive to the USB mode being detected.

4. The method of claim 3, wherein the step of connecting a logic confirming mechanism includes the step of connecting the first positive voltage source respectively to the first and second ports through first and second pull-up resistors.

5. The method of claim 3, wherein the step of connecting a logic confirming mechanism includes the step of respectively connecting first and second current sources to the first and second ports.

* * * * *